(12) United States Patent
Falco (10) Patent No.: US 11,072,091 B1
(45) Date of Patent: Jul. 27, 2021

(54) MATERIAL DELIVERY APPARATUS FOR CONTROLLED DELIVERY OF FOAM INTO A MIXER FOR PRODUCING FOAM CONCRETE

(71) Applicant: Paul Michael Falco, Lakewood Ranch, FL (US)

(72) Inventor: Paul Michael Falco, Lakewood Ranch, FL (US)

( * ) Notice: Subject to any disclaimer, the term of this patent is extended or adjusted under 35 U.S.C. 154(b) by 155 days.

(21) Appl. No.: 16/567,043

(22) Filed: Sep. 11, 2019

(51) Int. Cl.
| | | |
|---|---|---|
| B28C 5/42 | (2006.01) |
| B28C 5/38 | (2006.01) |
| C04B 38/10 | (2006.01) |
| C04B 40/00 | (2006.01) |
| C04B 111/00 | (2006.01) |
| C04B 111/40 | (2006.01) |

(52) U.S. Cl.
CPC ............ *B28C 5/4237* (2013.01); *B28C 5/386* (2013.01); *B28C 5/422* (2013.01); *B28C 5/4244* (2013.01); *B28C 5/4272* (2013.01); *C04B 38/10* (2013.01); *C04B 40/0046* (2013.01); *C04B 2111/00146* (2013.01); *C04B 2111/40* (2013.01)

(58) Field of Classification Search
CPC ..... B28C 5/4237; B28C 5/422; B28C 5/4244; B28C 5/386; B28C 5/4272; C04B 40/0046; C04B 38/10; C04B 2111/00146; C04B 2111/40
See application file for complete search history.

(56) References Cited

U.S. PATENT DOCUMENTS

| | | | | |
|---|---|---|---|---|
| 3,931,959 | A * | 1/1976 | Truman | ................... B05B 7/149 239/431 |
| 3,957,203 | A * | 5/1976 | Bullard | ................... B05B 13/06 239/128 |
| 4,789,244 | A * | 12/1988 | Dunton | ............... B01F 3/04992 366/101 |
| 5,556,033 | A * | 9/1996 | Nachtman | ................. B05B 7/32 239/343 |
| 6,418,948 | B1 * | 7/2002 | Harmon | ............ B01F 15/00032 134/167 R |
| 7,950,841 | B2 * | 5/2011 | Klein | ..................... B01F 15/063 366/4 |
| 8,235,576 | B2 * | 8/2012 | Klein | ..................... B01F 15/063 366/10 |
| 8,708,547 | B2 * | 4/2014 | Bilger | ..................... B28C 5/468 366/4 |

(Continued)

*Primary Examiner* — Charles Cooley
(74) *Attorney, Agent, or Firm* — Sanchelima & Associates, P.A.; Christian Sanchelima; Alexander Rodriguez (57) ABSTRACT

A material delivery apparatus for delivering foam into a mixer of a ready-mix truck comprising an elongated bar, a support arm, a guide tube and a delivery tube is disclosed. There is a foam tube having one end mounted to the delivery tube and another end mounted to a foam generator. The delivery tube slides within the guide tube. There is a cable mounted to the delivery tube and to a motor reel on an opposite end. Included is a control panel communicatively coupled to the motor reel and the foam generator. The mixer of a ready-mix truck is aligned underneath the delivery tube. The controller is operated to control volume and rate at which foam is to be delivered by the foam generator. The delivery tube is positioned to accurately delivery the foam in the mixer to mix the foam with concrete to produce foam concrete.

12 Claims, 6 Drawing Sheets

(56) References Cited

U.S. PATENT DOCUMENTS

| | | | | |
|---|---|---|---|---|
| 9,108,883 B2* | 8/2015 | Forgeron | ............... | B28C 5/4203 |
| 9,376,345 B2* | 6/2016 | Forgeron | ................ | C04B 22/10 |
| 9,463,580 B2* | 10/2016 | Forgeron | ................ | B28C 5/003 |
| 9,738,562 B2* | 8/2017 | Monkman | ............. | B28C 5/1856 |
| 9,758,437 B2* | 9/2017 | Forgeron | ................ | C04B 22/06 |
| 9,790,131 B2* | 10/2017 | Lee | ........................ | C04B 22/10 |
| 2002/0179119 A1* | 12/2002 | Harmon | ............ | B01F 15/00032 |
| | | | | 134/22.18 |
| 2005/0195681 A1* | 9/2005 | Gembala | ................ | B28C 5/381 |
| | | | | 366/46 |
| 2007/0171764 A1* | 7/2007 | Klein | ..................... | B28C 5/468 |
| | | | | 366/4 |
| 2009/0103392 A1* | 4/2009 | Bilger | .................... | B28C 5/468 |
| | | | | 366/4 |
| 2012/0250446 A1* | 10/2012 | Cook | ..................... | B28C 5/422 |
| | | | | 366/6 |
| 2018/0022654 A1* | 1/2018 | Forgeron | ................ | C04B 22/06 |
| | | | | 137/561 R |

* cited by examiner

MATERIAL DELIVERY APPARATUS FOR CONTROLLED DELIVERY OF FOAM INTO A MIXER FOR PRODUCING FOAM CONCRETE

BACKGROUND OF THE INVENTION

1. Field of the Invention

The present invention relates to a device used for introducing foam into a mixer for producing foam concrete. More specifically, the present invention relates to a material delivery apparatus for controlled delivery of foam into a mixer for producing foam concrete.

2. Description of the Related Art

Foam concrete is a type of lightweight concrete that is manufactured or produced by mixing a lightweight mortar result from water, Portland cement, fine sand, including or alone fly ash, and preformed stable foam. The foam is typically produced with the help of a foam generator by using a foaming agent. It is known that the foam concrete is provided in the form of a foamed grout or a foamed mortar. The foam concrete in the form of bricks, blocks or poured in-situ is used for thermal insulation over flat roofs or for cold storage walls or as non-load bearing walls in RCC/Steel framed buildings or for load bearing walls for low-rise buildings. Further, the foam concrete is used for bulk filling, using relatively low strength material, for redundant sewerage pipes, wells, disused cellars and basements, storage tanks, tunnels, subways etc. Further, the foam concrete is used for grouting for tunnel work, backfill to retaining walls and bridge abutment, infill to the spandrel walls of arch bridges, and so on.

Generally, the foam concrete is manufactured using an inline method and a pre-foam method. In the inline method, the base mix of cement and sand is added to a unit. In the unit, the mix is blended with foam thoroughly. The process of mixing is carried out with proper control to help in mixing of larger quantities. In pre-foam method, a ready-mix truck brings the base material to the site. Through the other end of the truck, the pre-formed foam is injected into the truck, while the mixer is rotating. This results in production of the foam concrete in small quantities for small works, like for grouting or trench fill works.

There are different mechanisms disclosed in the past that were used to deliver foam into a mixer of the ready-mix truck for production of the foam concrete. One such example is disclosed in United States patent application 20050195681. In US20050195681A1, it is disclosed that an apparatus for on-site manufacturing of lightweight concrete used for insulation in roof decks and roof systems of building structures. The apparatus is supported on a transportable trailer frame and includes a mixer, one or more tanks for holding water and chemical products, such as foaming agents, and a concrete pump. The chemical agents and water are forced through a foam-generating carburetor with pressurized air to produce a foam product. Concrete and the foam product are combined in the mixer, in accordance with a predetermined mixture ratio, and released into the concrete pump for forced discharge from the apparatus and application to a roof structure. An internal combustion engine drives hydraulic pumps, which operate several components of the apparatus. Controls are provided for operating the several components, functions and operations of the apparatus.

Although the apparatus discussed above are capable of manufacturing lightweight concrete, they have a few problems. For instance, a foam delivery pipe used to deliver the foam into the mixer is not seen by an operator, which might result in foam being delivered only at one side of the mixer. This may lead to uneven mixing of the foam with the concrete in the mixer. Which leads to a less than optimal mixture that will not perform at its best.

Other documents describing the closest subject matter provide for a number of more or less complicated features that fail to solve the problem in an efficient and economical way. None of these patents suggest the novel features of the present invention. Specifically, none of the disclosures in the art disclose a material delivery apparatus capable of accurately delivering foam into a mixer of a ready-mix truck by controlling operation of a delivery pipe used for delivering the foam.

Therefore, there is a need in the art for a material delivery apparatus capable of controlling a delivery pipe used for delivering foam into a mixer of a ready-mix truck.

SUMMARY OF THE INVENTION

It is one of the objects of the present invention to provide a material delivery apparatus for delivering foam into a mixer and avoids the drawbacks of the prior art.

It is another object of the present invention to provide a material delivery apparatus facilitating controlled delivery of foam into a mixer for preparation of foam concrete.

It is still another object of the present invention to provide a material delivery apparatus comprising a delivery tube for delivering foam into a mixer. The material delivery apparatus comprises an image acquisition device placed near the delivery tube for monitoring position of the delivery tube, which can be used to adjust the position of the delivery tube with the help of a cable coupled to the delivery tube.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a material delivery apparatus for delivering foam into a mixer of a ready-mix truck. The material delivery apparatus comprises an elongated bar, a support arm mounted to the elongated bar, and a delivery tube provided at the support arm. The material delivery apparatus comprises a foam tube wherein one end is mounted to the delivery tube and the other end is mounted to a foam generator. The material delivery apparatus comprises a cable. One end of the cable is mounted to the delivery tube and other end is mounted to a motor reel. The material delivery apparatus comprises a control panel communicatively coupled to the motor reel and the foam generator. The mixer of a ready-mix truck is aligned underneath the delivery tube. The mixer contains concrete. The controller is operated to control volume and a rate at which the foam is to be delivered by the foam generator. The control panel is operated to a control position of the delivery tube to accurately delivery the foam in the mixer to mix the foam with the concrete to produce foam concrete. Thereby resulting in an evenly mixed mixture.

Various features and embodiments of a material delivery apparatus for delivering foam into a mixer of a ready-mix truck are explained in conjunction with the description of FIGS. 1-6.

Figure 1:
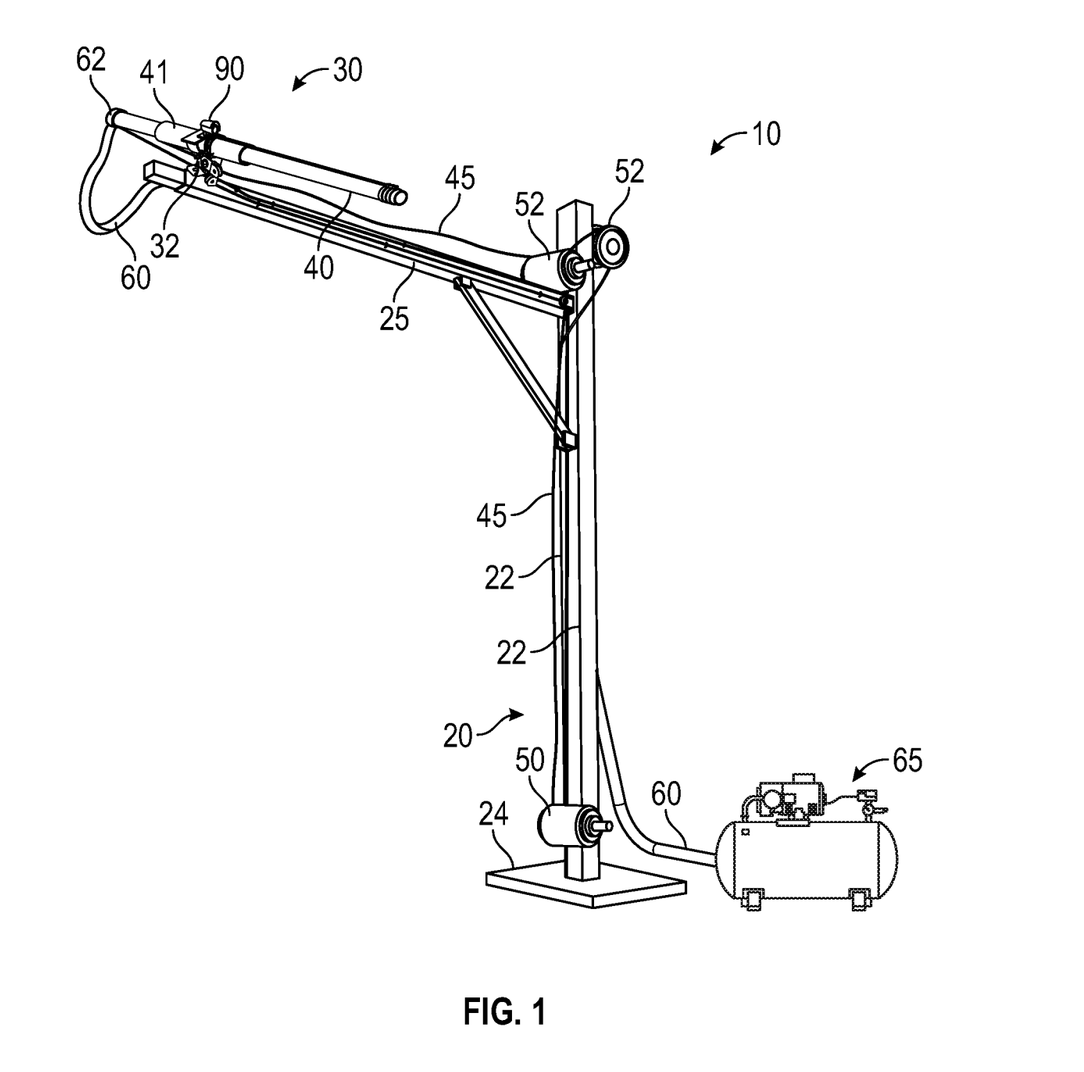
FIG. 1 illustrates a perspective view of a material delivery apparatus 10, in accordance with one embodiment of the present disclosure.

Referring to FIG. 1, a perspective view of a material delivery apparatus 10 is shown, in accordance with one embodiment of the present disclosure. Material delivery apparatus 10 comprises a support structure 20. Support structure 20 comprises an elongated bar 22 mounted to a base 24. Elongated bar 22 might be made up of metal or any other suitable material. Base 24 might be made up of concrete structure or might be affixed to the ground using known mechanism. Further, support structure 20 comprises a support arm 25 mounted to elongated bar 22 using known mechanisms such as fasteners or welding. As can be seen, support arm 25 is mounted perpendicularly to elongated bar 22 at a top portion of elongated bar 22.

Figure 2:
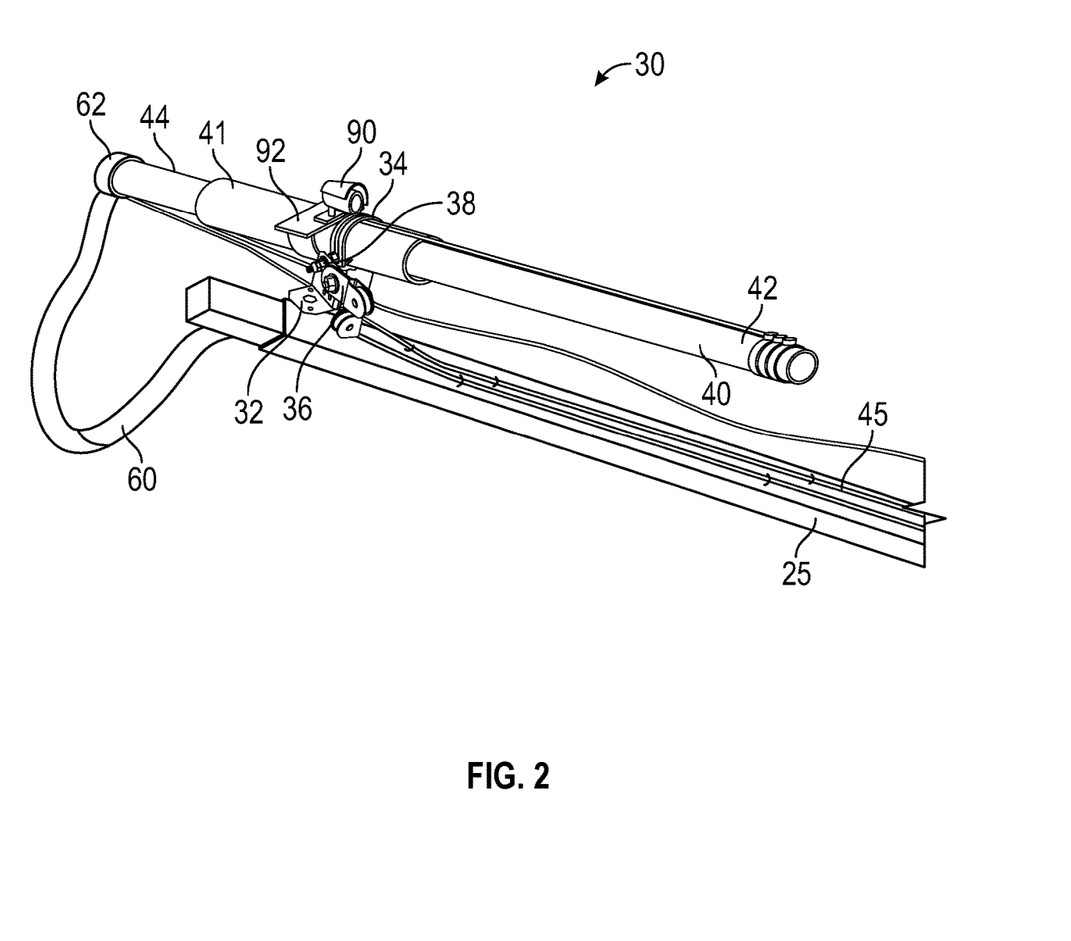
FIG. 2 illustrates a perspective view of a material delivery assembly 30 of the material delivery apparatus 10, in accordance with one embodiment of the present disclosure.
Figure 3:
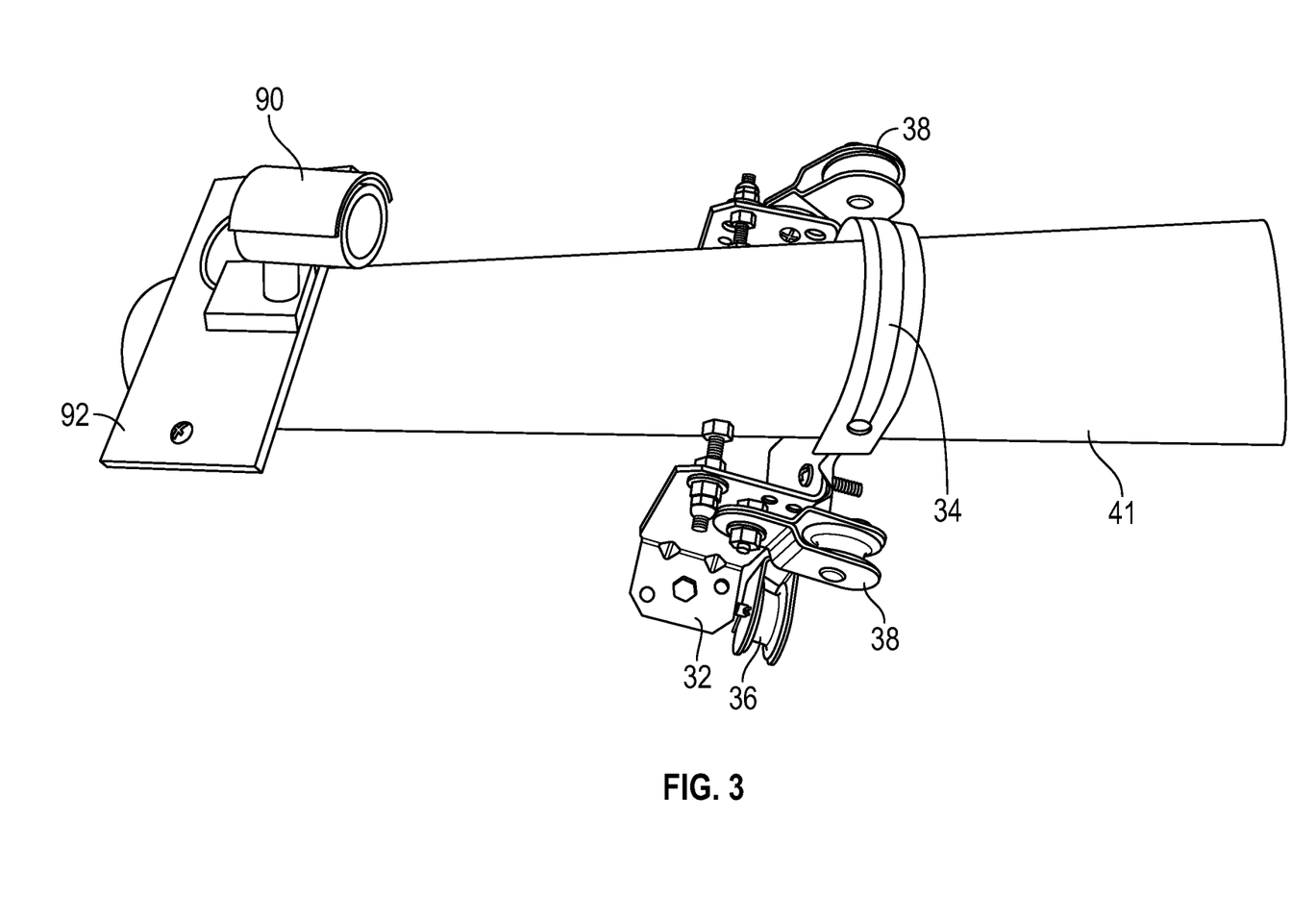
FIG. 3 illustrates the material delivery assembly 30 comprising a delivery tube 40, in accordance with one embodiment of the present disclosure.

Material delivery apparatus 10 further comprises a material delivery assembly 30 mounted to support arm 25. Referring to FIGS. 2 and 3, material delivery assembly 30 is seen and explained hereafter. Material delivery assembly 30 comprises a frame 32 mounted to support arm 25 using known mechanisms such as fasteners or welding. Material delivery assembly 30 further comprises a bracket 34 mounted to frame 32. Bracket 34 might be provided in a semi-circular or circular part made up of metal or any other suitable material. Bracket 34 is used for receiving a guide tube 41. Guide tube 41 might be made of metal and might be provided as a hollow tube. Guide tube 41 might be configured to receive delivery tube 40 therein. Delivery tube 40 slides through guide tube 41. Further, material delivery assembly 30 comprises a first pulley 36 and a second pulley 38 placed at either side of delivery tube 40. First pulley 36 and second pulley 38 might be placed perpendicularly and might be used for receiving a cable 45 for controlling delivery tube 40.

Delivery tube 40 might be made up of metal and might be provided as a hollow tube. As can be seen, delivery tube 40 is provided in guide tube 41, in that delivery tube 40 is slidable through guide tube 41. Delivery tube 40 comprises a first end 42 and a second end 44. At first end 42, delivery tube 40 is provided with a cable connector 46. It should be understood that one end of cable 45 is mounted to cable connector 46 provided at delivery tube 40 and the other end might be mounted to a motor reel 50. Motor reel 50 might be used to wind or release cable 45 so as to adjust the length of cable 45, which in turn adjusts the position of delivery tube 40 via first pulley 36 and second pulley 38. In one example, at least one third pulley 52 might be provided at support structure 20 and/or at support arm 25. At least one third pulley 52 might be used to lower support arm 25 with respect to support structure 20.

Further, material delivery apparatus 10 may comprise a foam tube 60. Foam tube 60 may indicate a flexible hose made up of plastic or any other suitable material. Foam tube 60 is mounted to a connecting tube 62 and a foam generator 65. In other words, one end of foam tube 60 is mounted to connecting tube 62 provided at second end 44 of delivery tube 40 and the other end is mounted to foam generator 65. Further, connecting tube 62 is mounted to delivery tube 40, as shown in FIG. 1.

Figure 4:
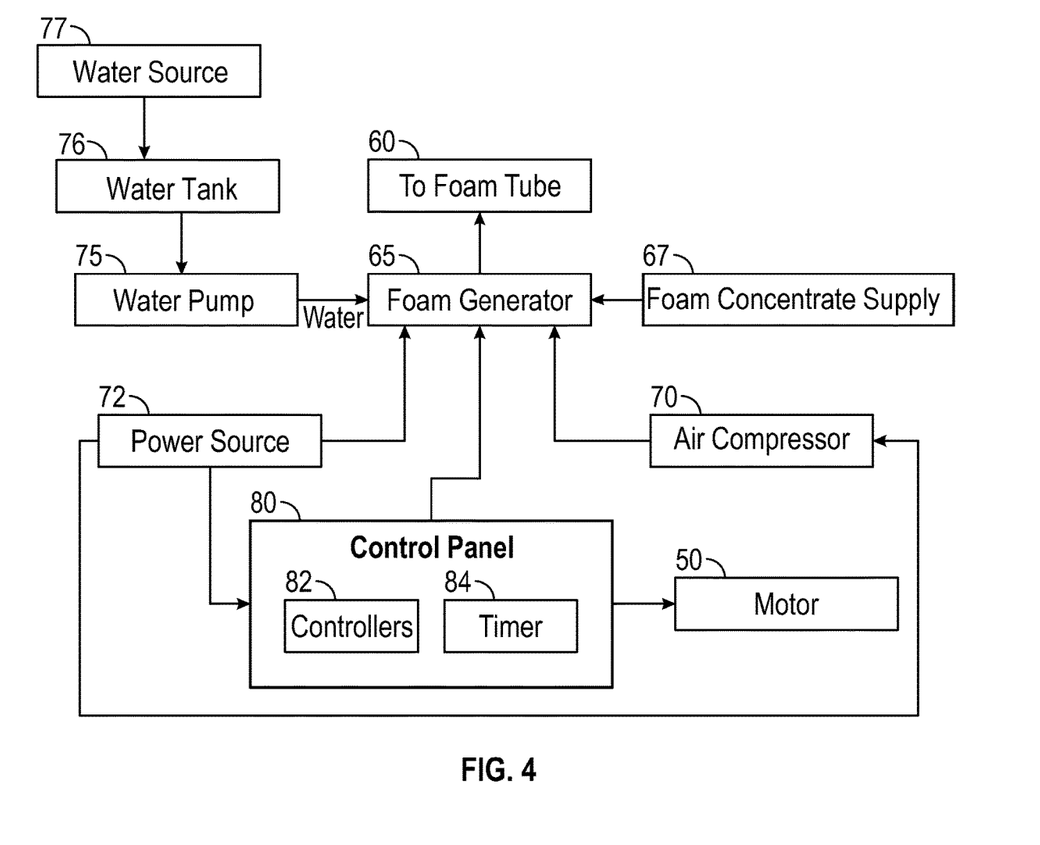
FIG. 4 illustrates a block diagram of the material delivery apparatus 10, in accordance with one embodiment of the present disclosure.

Now referring to FIGS. 1 and 4, foam generator 65 is mounted to a foam concentrate supply 67 and an air compressor 70. In addition, foam generator 65 is mounted to a power source 72. Further, foam generator 65 is mounted to a water pump 75. Water pump 75 may receive water from a water tank 76 that may receive water from a water source 77. Furthermore, foam generator 65 is operatively mounted to a control panel 80. Control panel 80 may include, but not limited to a computer/desktop, a laptop, a mobile phone, a server and so on. Control panel 80 may comprise a processor and memory, in which the processor is configured to execute program instructions stored in the memory. Additionally, control panel 80 may comprise one or more controllers 82 and a timer 84. One or more controllers 82 may include switches/buttons or toggles to operate each of delivery tube 40 via cable 45, the motor, foam generator 65, air compressor 70, and water pump 75. It should be understood that control panel 80 might be placed close to material delivery apparatus 10 or might be placed remotely to material delivery apparatus 10. Control panel 80 might use a wired or wireless communication means including but not limited to LAN, internet, Wi-Fi, cellular networks and so on to operate each of delivery tube 40 via cable 45, the motor, foam generator 65, air compressor 70, and water pump 75.

In order to generate foam and to supply through delivery tube 40, a user of material delivery apparatus 10 may operate control panel 80. At first, foam concentrate supply 67 might be filled with foam concentrate. In one example, 55 gallons of foam concentrate might be stored in foam concentrate supply 67. In order to generate foam, the user may operate foam generator 65 by supplying water from water pump 75, which comes from water tank 76 which is filled with water from water source 77. It should be understood that the water might be pumped using a pump. Concurrently or consecutively, Control panel 80 might be operated to supply air pressure from air compressor 70 and water from water pump 75. In one example, controllers 82 may be operated to supply air pressure at 24 CFM at the rate of 80 PSI. In one example, the water might be pumped at 20 gpm at the rate of 40 PSI. Subsequently, controllers 82 might be operated to generate foam in foam generator 65.

In one embodiment, control panel 80 might be provided with timer 84. Timer 84 might be used to operate controllers 82 for a predetermined time and also to operate foam generator 65 for generating the foam. After generating the foam, the user may operate control panel 80 to pump the foam generated to delivery tube 40 via foam tube 60.

Figure 6:
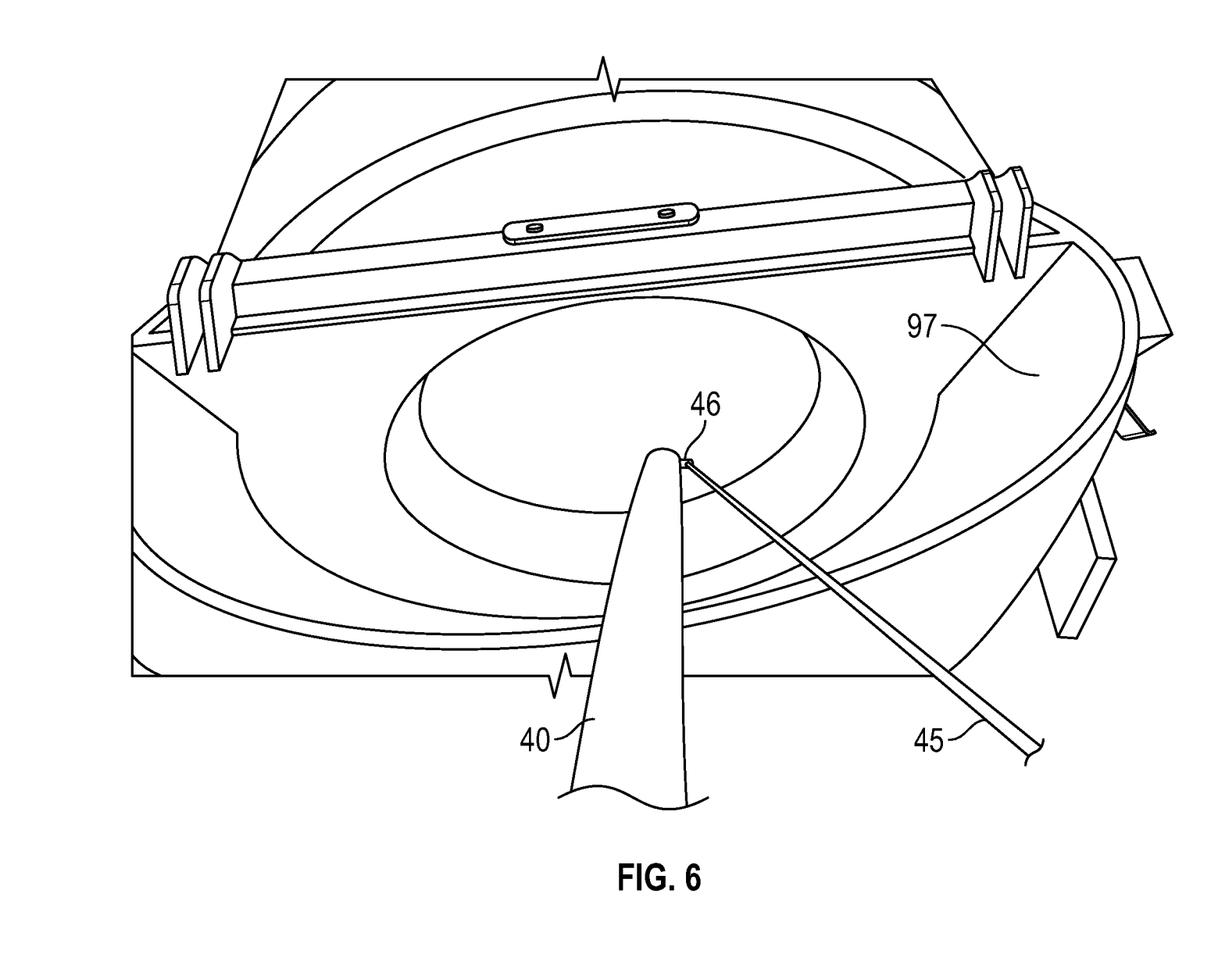
FIG. 6 illustrates a top perspective showing a delivery tube 40 positioned in the mixer hopper 97, in accordance with one embodiment of the present disclosure.

In one embodiment, material delivery apparatus 10 might be provided with an image acquisition device 90 mounted on top of delivery tube 40 as shown in FIGS. 1, 2 and 3. Image acquisition device 90 might be mounted to delivery tube 40 via a plate 92. Plate 92 might be removably mounted to delivery tube 40 using known mechanisms such as fasteners. Image acquisition device 90 may indicate a camera or video capturing device capable of capturing still images or a video. Image acquisition device 90 is communicatively coupled to control panel 80 using a wired or wireless communication means. It should be understood that image acquisition device 90 is configured to capture still images or video of a field of view to control panel 80 for processing data at control panel 80. In the current implementation, image acquisition device 90 is positioned in such a way that image acquisition device 90 is made to face first end 42 of the delivery tube 40, as shown in FIG. 6. The images or video captured by image acquisition device 90 can be displayed on a display device of control panel 80.

Figure 5:
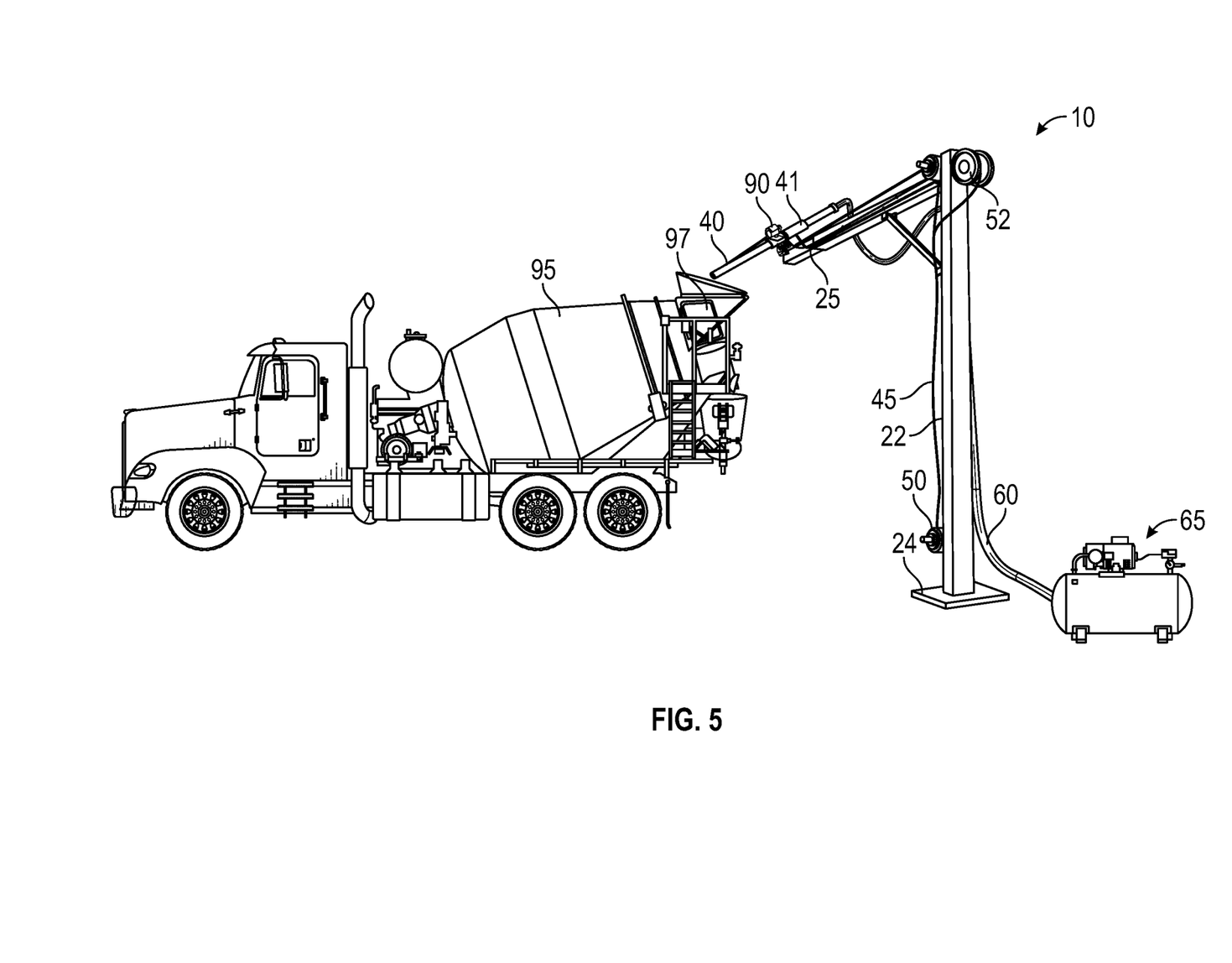
FIG. 5 illustrates a material delivery apparatus 10 positioned to deliver foam into a mixer hopper 97 of a ready-mix truck 95, in accordance with one embodiment of the present disclosure.

Now, referring to FIGS. 5 and 6, operation of material delivery apparatus 10 is explained. As explained above, elongated bar 22 is erected over base 24 at a height more than a ready-mix truck 95. Specifically, elongated bar 22 is erected in such a way that delivery tube 40 is coupled to support arm 25 and is made to face down towards an opening of a mixer hopper 97 of ready-mix truck 95, as shown in FIG. 5. Further, referring to FIG. 6, a top perspective view of delivery tube 40 placed towards the opening of mixer hopper 97 is shown.

As known, concrete is placed in mixer hopper 97 of ready-mix truck 95. In order to produce foam concrete, foam generated at foam generator 65 is pumped into mixer hopper 97. Specifically, the foam is pumped from foam generator 65 with foam tube 60. It should be understood that a user or operator might operate control panel 80 to determine the amount of foam to be pumped from foam generator 65. Further, the user might operate control panel 80 to determine a rate at which the foam needs to be pumped. When the foam is pumped from foam generator 65, the foam is made to flow through foam tube 60 into delivery tube 40 via connecting tube 62. Further, the foam is dispensed or delivered into mixer hopper 97 from first end 42 of delivery tube 40.

Concurrently, the user may operate or configure control panel 80 in order to control position of delivery tube 40 with the help of cable 45 coupled to delivery tube 40. In order to control the position of delivery tube 40, the user may consider the image or video being provided by image acquisition device 90. It should be understood that the image or video is displayed at the display device of image acquisition device 90. Based on the position obtained using image acquisition device 90, the user may control motor reel 50 to push/pull cable 45 such that delivery tube 40 is pushed or pulled with the help of cable connector 46 in order to move delivery tube 40 linearly. It should be noted that delivery tube 40 is pulled upwards by pulling cable 45. In order to move delivery tube 40 downwards, cable 45 might be loosened so that delivery tube 40 comes down and cable 45 might be held to secure the position of delivery tube 40. Delivery tube 40 is actuated by motor reel 50 to move delivery tube 40 either up, down or sideways with the use of first pulley 36, second pulley 38, third pulley 52 and cable 45. Motor reel 50 moving forward lowers delivery tube 40, while reversing of motor reel 50 raises delivery tube 40. Further, cable 45 is operated to adjust first end 42 of delivery tube 40 slightly upwards or downwards or move sideways. The position of delivery tube 40 is adjusted to ensure delivery of the foam at desired position in mixer hopper 97.

It should be understood that delivery tube 40 is pulled with the help of cable 45 such that delivery tube 40 is made to slide upwards when mixer hopper 97 of ready-mix truck 95 needs to be aligned underneath delivery tube 40. Upon aligning mixer hopper 97 in line of axis of delivery tube 40, cable 95 is operated to lower delivery tube 40 such that delivery tube 40 is made to enter the opening of mixer hopper 97. Subsequently, foam generator 65 might be operated to deliver the foam into mixer hopper 97 with the help of foam tube 60, connecting tube 62 and delivery tube 40. As explained above, the user may view the position of delivery tube 40 with the help of image acquisition device 90 and the user may control motor reel 50 to push/pull cable 45 such that delivery tube 40 is pushed or pulled with the help of cable connector 46 in order to adjust first end 42 of delivery tube 40 slightly upwards or downwards or sideways. The position of delivery tube 40 is adjusted to ensure delivery of the foam at desired position in mixer hopper 97. After delivering the foam in mixer hopper 97, delivery tube 40 might be pulled away from mixer hopper 97.

It should be understood that elongated bar 22 might be provided in such a way that the height of elongated bar 22 can be adjusted manually or electronically. Further, the length of support arm 25 may also be extended or contracted manually or electronically such that material delivery apparatus 10 can be used in various configurations. As such, the foam can be delivered into mixer hopper 97 of ready-mix truck 95 in various configurations.

In one example, cable 45 might be used to lower support arm 25 to align delivery tube 40 in a desired position to deliver foam into mixer hopper 97.

It should be understood that the pulley system that controls the delivery tube could also be mounted on a support apparatus that exists at a concrete plant. Further, it should be understood that one cable is used to control movement of the delivery arm and other cable might be used to lower the arm.

Based on the above, it is evident that the material delivery apparatus provides controlled delivery of the foam into a mixer for preparation of the foam concrete. The present disclosure provides a unique way of controlling the rate and volume of the foam delivery and also the controlling the delivery tube with the help of the images or video captured by the image acquisition device placed near the delivery tube. This way, the user may delivery the foam into the mixer without much difficulty. In other words, the user can operate the controller to deliver the foam into the mixer without having to have complex mechanism to manually adjust position of the delivery tube or to climb up the mixer to adjust the position of the delivery tube. Importantly, with the present invention, an operator of the present invention may be able to inject foam in a precise and repeatable manner from a remote location into the mixer of a truck. The operator may be able to visually monitor the process and can control the present invention to make adjustments and modifications as needed while injecting the foam.

It should be understood that the figures are provided for illustrative purpose only and the shapes and sizes illustrated in the figures should not be construed in limited sense. A person skilled in the art will appreciate that shape and sizes of the parts shown in the figures can be altered and/or other mechanism similar to the constructional features described above may also be used to implement the features described above. Such implementations should fall within the scope of the present disclosure.

The parts described herein can be permanently coupled using known mechanism at a construction site or may be removably coupled using known mechanisms such as fasteners or other mechanisms so as to allow the user to assemble or disassemble based on the need.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a material delivery apparatus, the material delivery apparatus comprising:
   a ready-mix truck having a mixer hopper mounted thereon;
   a support structure comprising an elongated bar mounted to a base;
   a support arm mounted to the elongated bar;
   a material delivery assembly including a frame mounted to said support arm, said material delivery assembly further includes a bracket mounted to said frame, a first pulley and a second pully;
   a delivery tube having a first end and a second end, said first pulley and said second pulley mounted on either side of said delivery tube;
   a guide tube, said delivery tube is slidable within said guide tube, said guide tube is mounted to said support arm;
   a cable connector mounted at said first end of said delivery tube;
   a third pulley mounted to said support arm of said support structure adapted to lower said support arm;
   a foam tube, wherein one end of the foam tube is mounted to a connecting tube and other end is mounted to a foam generator and wherein the foam generator is configured to generate foam, said foam generator is connected to a foam concentrate supply, an air compressor, a power source and a water pump;
   said water pump receives water from a water tank that is filled with water from a water source;
   a cable received by said first pulley and said second pulley, wherein one end of the cable is mounted to the cable connector of the delivery tube and other end is mounted to a motor reel; and
   a control panel communicatively coupled to the motor reel and the foam generator, said control panel further includes controllers to facilitate control of said delivery tube, wherein the mixer hopper of the ready-mix truck is aligned underneath the delivery tube, wherein the mixer hopper comprises concrete, wherein the control panel is operated to control volume and a rate at which the foam is to be delivered by the foam generator, wherein the control panel is operated to control position of the delivery tube to accurately delivery the foam in the mixer hopper to mix the foam with the concrete to produce foam concrete.

2. The system of claim 1, wherein the support arm is mounted perpendicularly to the elongated bar.

3. The system of claim 1, wherein the motor reel and the foam generator are communicatively coupled to the control panel.

4. The system of claim 1, wherein the control panel comprises one of a desktop, a mobile phone, and a tablet.

5. The system of claim 1, wherein said first pulley and second pulley are adapted for operating the delivery tube using the cable.

6. The system of claim 1, wherein the connecting tube is provided between the delivery tube and the foam tube.

7. The system of claim 1, comprises an image acquisition device mounted at the delivery tube, wherein the image acquisition device is positioned facing the delivery tube.

8. The system of claim 7, wherein the image acquisition device is communicatively coupled to the control panel.

9. The system of claim 8, wherein the image acquisition device is used to capture position of the delivery tube aligned with the mixer hopper.

10. The system of claim 1, wherein the air compressor supplies air pressure to the foam generator.

11. The system of claim 10, wherein said water pump supplies water to the foam generator.

12. The system of claim 1, wherein the control panel comprises a timer for operating the foam generator for a predetermined time.

* * * * *